United States Patent [19]

Schwimmer

[11] 4,132,530

[45] Jan. 2, 1979

[54] TEMPERATURE CONTROL IN EXOTHERMIC/ENDOTHERMIC REACTION SYSTEMS

[75] Inventor: Michael F. Schwimmer, Tucson, Ariz.

[73] Assignee: UOP Inc., Des Plaines, Ill.

[21] Appl. No.: 852,017

[22] Filed: Nov. 16, 1977

Related U.S. Application Data

[63] Continuation-in-part of Ser. No. 841,876, Oct. 13, 1977, which is a continuation-in-part of Ser. No. 794,152, May 5, 1977.

[51] Int. Cl.² ............... B01J 8/02; C10G 35/04; G05D 11/02; G06F 15/46
[52] U.S. Cl. ............... 23/230 A; 137/2; 137/110; 208/146; 208/DIG. 1; 364/500; 422/109
[58] Field of Search ............ 23/230 A, 253 A, 288 R, 23/288 H, 288 K; 208/146, DIG. 1; 137/3, 90, 2, 110; 364/500

[56] References Cited

U.S. PATENT DOCUMENTS

| | | | |
|---|---|---|---|
| 2,285,716 | 6/1942 | Hulsberg | 23/288 R |
| 2,330,767 | 9/1943 | Wetty, Jr. | 23/288 R X |
| 2,606,862 | 8/1952 | Keith | 208/146 |
| 3,031,267 | 4/1962 | Martin et al. | 23/253 A X |
| 3,506,715 | 4/1970 | Clark | 23/288 R X |
| 3,751,229 | 8/1973 | Bajek et al. | 23/288 R X |
| 3,979,183 | 9/1976 | Scott | 208/DIG. 1 X |

*Primary Examiner*—Joseph Scovronek
*Attorney, Agent, or Firm*—James R. Hoatson, Jr.; Robert W. Erickson; William H. Page, II

[57] ABSTRACT

Control of temperature increases (delta-T) through a reaction zone, in which both exothermic and endothermic reactions are effected, is achieved by sensing the inlet temperature of the charge stock, a highest temperature from a plurality of intermediate loci within the reaction zone and the outlet temperature of the effluent from the reaction zone. The inlet temperature sensor co-acts with a Temperature Recorder Controller (TRC), having an adjustable set point (control point), to produce a representative signal which is transmitted to flow-regulating means which adjusts the quantity of charge stock bypassing the feed heater. The difference between the inlet and intermediate temperatures, and that between the intermediate and outlet temperatures are determined to produce two delta-T signals which are transmitted to a Double differential Temperature Recorder Controller (DdTRC) which develops a signal representing the difference between the two delta-T signals compared to a preset difference. The signal is transmitted to the inlet Temperature Recorder Controller to adjust the set point thereof, and the quantity of charge stock bypassing the feed heater is further regulated responsive thereto. Enhanced control is afforded by selecting the higher of the outlet and highest intermediate temperatures, developing another representative signal and adjusting, or overriding the signal being transmitted to the charge stock bypass regulating means.

7 Claims, 1 Drawing Figure

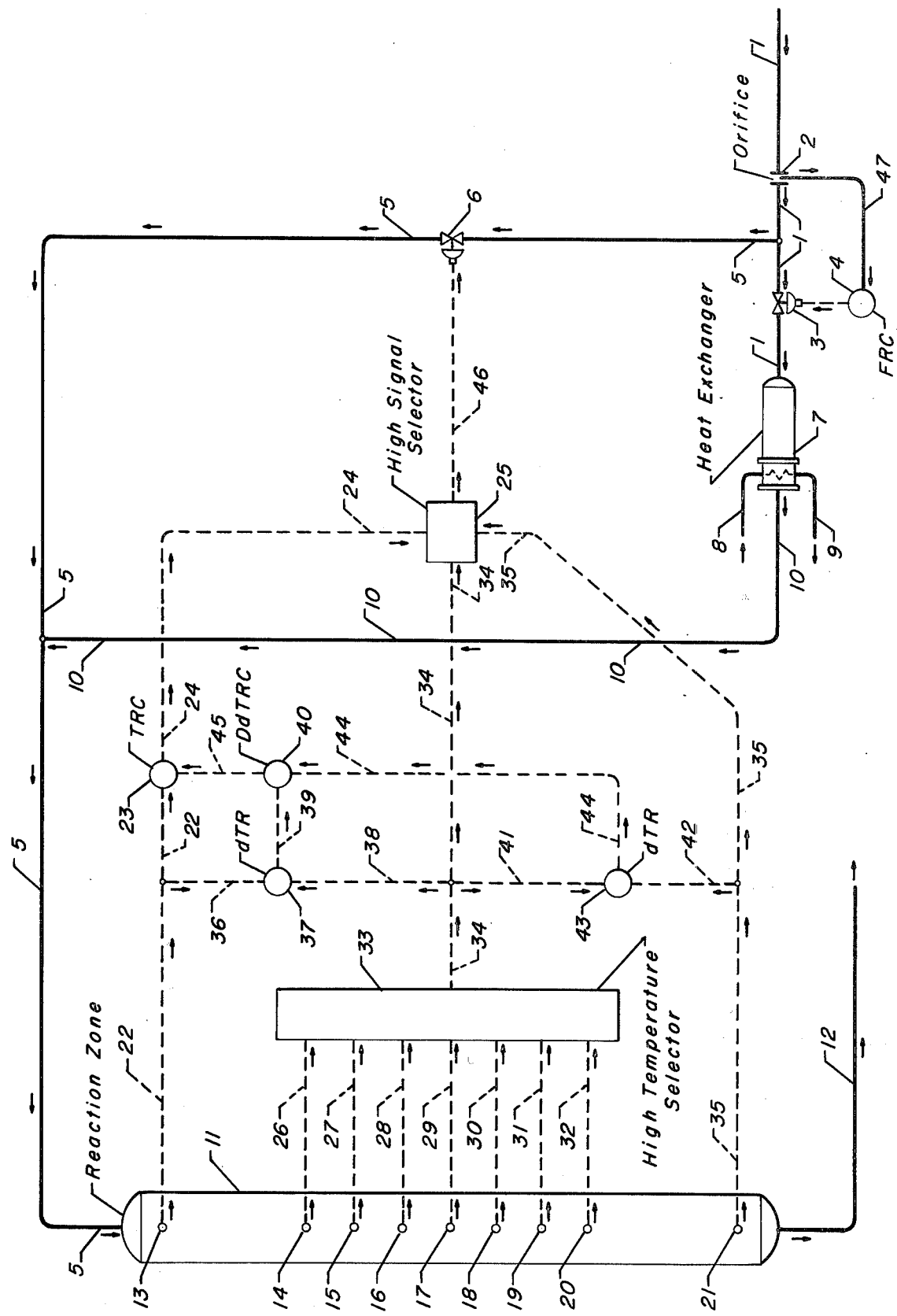

TEMPERATURE CONTROL IN EXOTHERMIC/ENDOTHERMIC REACTION SYSTEMS

RELATED APPLICATIONS

The present application is a Continuation-In-Part of my copending application, Ser. No. 841,876, filed Oct. 13, 1977, which, in turn, is a Continuation-In-Part of my copending application, Ser. No. 794,152, filed May 5, 1977, all the teachings of which copending applications are incorporated herein by way of specific reference thereto.

APPLICABILITY OF INVENTION

My invention concept, as herein more fully described, encompasses a technique for determining the location, in an exothermic/endothermic catalytic hydrocarbon conversion process, where the highest temperature occurs and which thus indicates the transition point at which the reactions commence changing from exothermic to endothermic; the technique is intended to prevent and alleviate so-called temperature run-away prevalent in such processes. Therefore, the present invention essentially involves a method for controlling the temperature rise through a catalytic reaction zone in which exothermic reactions predominate.

Whereas hydrogen-producing reactions — e.g. dehydrogenation of naphthenes to aromatic hydrocarbons — are endothermic in nature, hydrogen-consuming reactions are primarily exothermic. The latter are prevalent in a multitude of hydrocarbon conversion processes widely utilized throughout the petroleum industry, and are often integrated in combination with an endothermic reaction process — e.g. a combination of hydrotreating followed by catalytic reforming. Principally exothermic processes include hydrodesulfurization, hydrodenitrification, dealkylation, hydrotreating (olefin saturation), hydrocracking, etc., all of which have been previously categorized as hydroprocesses. In many such processes, the reactions being effected are both exothermic and endothermic, with the former generally predominating. Specifically, the present control technique is particularly directed toward control of the temperature increase experienced through an exothermic catalytic reaction zone in which endothermic reactions are also taking place. As is well known in the appropriate art, unabated exothermic reactions can readily evolve into the natural consequence of a temperature run-away to the extent that catalyst damage (often irreparable), hardware damage and undesired side reactions take place. The principal function of the present control system is to insure against deleterious temperature run-aways in hydrocarbon processes in which the reactions effected are primarily exothermic, while simultaneously considering the effect of endothermic reactions.

OBJECTS AND EMBODIMENTS

An object of my invention is to provide a method for determining the location in an exothermic/endothermic reaction zone where the highest temperature occurs and which thus indicates the transition point where such reactions commence changing from exothermic to endothermic, and for controlling the temperature rise through such a reaction zone. A corollary objective is directed toward a control system for preventing temperature run-away in a hydrocarbon conversion process in which hydrogen is consumed.

More specifically, my inventive concept directs itself to a cascade temperature control system, the objective of which resides in controlling the hydrogen-consuming processing of hydrocarbons.

In one embodiment, therefore, the present invention is directed toward a hydrocarbon conversion system wherein (1) a hydrocarbonaceous charge stock is introduced into heating means in which the temperature thereof is increased prior to passing into a reaction zone, and, (2) the reactions effected in said reaction zone are both exothermic and endothermic in nature, and provides the method of controlling the temperature rise through said reaction zone which comprises the steps of: (a) sensing (i) the temperature of said charge stock at the inlet to said reaction zone and developing a first signal representative thereof; (ii) the temperatures at a plurality of intermediate loci within said reaction zone, developing a plurality of signals, each being representative of and having associated therewith one of said temperatures, and selecting the signal representing the highest of said plurality of temperatures as a second signal; and, (iii) the temperature of the effluent from said reaction zone and developing a third signal representative thereof; (b) comparing said inlet charge stock temperature with that temperature specified by the adjustable set point of a temperature controller, developing a fourth signal representative of said comparison and regulating the quantity of said charge stock which is caused to bypass said heating means in response to said fourth signal; (c) measuring the difference between said first and second signals and developing a fifth signal representative of said difference; (d) measuring the difference between said second and third signals and developing a sixth signal representative of said difference; (e) comparing said fifth and sixth signals, developing a seventh signal representative of said comparison and adjusting the set point of said temperature controller in response to said seventh signal; and, (f) further regulating the quantity of said charge stock which is caused to bypass said heating means in response to the adjustment of said set point.

This embodiment is further characterized in that a selection is made of the higher of said second and third signals, and said fourth signal is adjusted, or overridden in response to said selected signal.

In another embodiment, my invention is intended for utilization in a hydrocarbon conversion process wherein (1) a hydrocarbon charge stock is passed into heating means in which its temperature is increased prior to the introduction thereof into a reaction zone and, (2) the reactions effected in said zone are both exothermic and endothermic in nature, and affords a control system for controlling the temperature rise through said reaction zone which comprises, in cooperative relationship: (a) first temperature-sensing means, sensing the temperature of said charge stock at the inlet to said reaction zone and developing a first signal representative thereof; (b) a plurality of second temperature-sensing means sensing the temperatures at a plurality of intermediate loci within said reaction zone; (c) high temperature selecting means, co-acting with said plurality of temperature-sensing means, selecting the highest of said temperatures and developing a second signal representative thereof; (d) third temperature-sensing means, sensing the temperature of the effluent from said reaction zone and developing a third signal representative thereof; (e) set point-adjustable temperature control means co-acting with said first signal and developing a fourth signal representative of a comparison between said first signal and said set point; (f) flow regulating means co-acting with said fourth signal whereby the quantity of said charge stock bypassing said heating means is adjusted in response thereto; (g) first differential temperature means measuring the difference between said first and second signals and developing a fifth signal representing said difference; (h) second differential temperature means measuring the difference between said second and third signals and developing a sixth signal representing said difference; (i) means for comparing said fifth and sixth signals, and developing a seventh signal representing the comparison; and, (j) means for adjusting the set point of said set point-adjustable temperature control means in response to said seventh signal.

The above-defined control system is additionally characterized in having high-signal selecting means adjusting, or overriding the fourth signal responsive to the higher of said second and third signals.

Other contemplated objects and embodiments, although not specifically delineated herein, will become evident from the following, more detailed description of my invention and the exothermic reaction control method which it encompasses. In one such additional embodiment, flow-control means is used to maintain the total quantity of the feed stream to the reaction zone substantially constant.

CITATION OF PRIOR ART

Control systems, as well as their methods of use, must be generally acknowledged as old in the art of hydrocarbon processing. Similarly, candor compels recognition of the fact that the published literature is replete with a myriad of techniques designed to afford some measure of control over some aspect of reaction zone temperature; this, whether the reactions are principally endothermic, exothermic, or both. In view of the voluminous nature thereof, no attempt will be made herein to delineate exhaustively the appropriate prior art.

Much of the early work in the control system art was directed toward fractionation column temperature control for the avowed purpose of controlling the composition of the product at either end thereof. For instance, in U.S. Pat. No. 2,580,651 (Cl. 203-2), issued Jan. 1, 1952, a double-differential temperature sensing system, above and below the feed tray, is utilized to control the heat-input to the column via the reboiled liquid bottoms stream. The flow rate of the heat-exchange medium is regulated in response to the signal developed by the double-differential temperature controller, thereby adjusting the heat-input to the reboiler section of the column.

Control of reaction zone severity (moderating the inlet and outlet temperatures, and regulating the catalyst bed inlet temperature), in response to the octane rating of the normally liquid effluent from a catalytic reforming process, is the subject of U.S. Pat. No. 3,751,229 (Cl. 23-253A), issued Aug. 7, 1973. Three variations are illustrated in the three Figures; in FIG. 1, the inlet temperature is sensed and compared to that called for by a set point-adjustable temperature controller, and a representative signal is transmitted to regulating means to adjust the quantity of fuel employed in a direct-fired heater into which the charge stock is passed. A signal representing the octane rating of the liquid phase effluent is generated and transmitted to the temperature controller to adjust the set point thereof. In FIG. 2, a set point-adjustable differential temperature controller monitors the inlet and outlet temperatures of the reaction and compares the delta-T with that called for by the set point which is adjusted in response to the signal generated by the octane monitor. A signal representative of the comparison between the delta-T and the set point is transmitted to the inlet temperature controller to re-adjust its set point, and the flow of fuel to the direct-fired heater is regulated accordingly. In FIG. 3, the inlet temperature controller is eliminated and the fuel regulating signal is transmitted directly from the set point-adjustable differential temperature controller.

A method for effecting heat balance in a fractionation column, and a control system therefor, is illustrated in U.S. Pat. No. 4,024,027 (Cl. 203-2), issued May 17, 1977. The fractionation column functions under total reflux with the desired overhead product stream (in this instance benzene is separated from a mixture thereof with toluene and xylene) being withdrawn from a locus below the locus of reflux introduction and below the uppermost fractionation tray. Signals representing three delta-T's are utilized in regulating the quantity of reflux returned to the top of the column and the enthalpy (heat-input content) of the reboiled liquid stream. With respect to the latter, two temperatures are sensed below the feed tray and proximate thereto. A differential temperature recorder controller measures the difference and transmits an appropriate signal to a set point-adjustable flow controller which regulates the flow of the heat-exchange medium employed to raise the temperature of and partially vaporize the reboiled bottoms stream. Reflux return is regulated utilizing four temperature sensors spaced along virtually the entire height of the column, one pair being above the feed tray and the second below. The temperature differential for each pair is determined; representative signals are transmitted to a double differential summing relay which transmits an appropriate signal to a double differential temperature recorder controller. The latter transmits an appropriate signal to regulating means which adjusts the flow of benzene withdrawn from the column. This signal is also used in conjunction with an internal reflux modulator to regulate reflux return.

SUMMARY OF INVENTION

In essence, the present invention insures against temperature run-aways by controlling the temperature rise experienced through the reaction zone of a catalytic process wherein the reactions effected are both exothermic and endothermic. Although the method of control, and system therefor, may be applied to non-catalytic reactions, utilization in those processes which are catalytically effected will be more advantageous. Furthermore, the number of reaction zones employed in any selected process is inconsequential, as is the fact that two or more zones may be utilized either in series, or in parallel. With some modifications, additional benefits accrue where the control system and method functions with two or more parallel-flow catalytic reaction zones.

As hereinbefore stated, the control system is intended to control the exothermic temperature rise through the reaction zone. The endothermic reactions taking place simultaneously, as is quite common when utilizing dual-function catalytic composites, form the basis for the method and system founded upon the present inventive concept. Likewise, there is no intent to limit the present invention to the physical and/or chemical characteristics of the catalytic composite employed within the reaction zone. The sole criterion is whether, at any given point in time, the exothermic reactions predominate to the extent that a temperature rise through the reaction zone is experienced, and the possibility of a temperature run-away becomes imminent.

In hydrocarbon processing, regardless of the particular reactions involved, the fresh feed stream, or charge stock, is heated to an elevated temperature prior to the introduction thereof into the reaction zone. The particular level to which the temperature is increased, is determined by the temperature desired at the inlet to the catalyst bed within the reaction zone. During the design of a hydrogen-consuming, exothermic process, previous experience will dictate an advisable maximum allowable temperature differential (increase) across the catalyst bed for the intended fresh feed capacity, or charge rate. This delta-T is generally dictated by the maximum allowable catalyst bed, or product effluent outlet temperature which, when exceeded, will result in detrimental reactions and/or initiate a temperature run-away such that catalyst damage (primarily deactivating carbon deposition or change in physical characteristics) constitutes a serious risk.

The method of controlling the temperature rise through the reaction zone, or the overall exothermicity of the reactions, is effected through the use of a cascade control system which regulates the quantity of fresh feed charge stock which is not increased in temperature prior to the introduction thereof into the reaction zone. That is, the quantity of comparatively "cold" feed which is caused to bypass the heating means is adjusted responsive to output signals generated by the control system. Briefly, the fresh charge stock, on flow control, is introduced into the process at a substantially constant rate which is specified by the design liquid hourly space velocity (volumes of charge stock per hour per volume of catalyst within the reaction zone). A portion of the feed passes through suitable heating means which may be a direct-fired heater, and/or an indirect heat-exchange system, the latter utilizing one or more hotter streams from within the overall process. The remaining portion of the fresh feed stream bypasses the heating means and is subsequently admixed with the heated portion.

The temperature of the total feed reactant stream as it enters the reaction zone, or initially contacts the catalytic composite disposed therein, is determined by suitable temperature-sensing means co-acting with a Temperature Recorder Controller (TRC) having an adjustable set point. A comparison is made of the inlet, or initial catalyst bed temperature with that temperature specified by the adjustable set point of the TRC; a signal is generated which represents the comparison, and is transmitted to flow-regulating means — e.g. a flow control valve — which is adjusted in response thereto, and the quantity of charge stock caused to bypass the charge heater is regulated accordingly. Where the inlet temperature is higher than that specified by the adjustable set point of the TRC, the generated signal will effect a further opening of the flow control valve and a greater quantity of the fresh feed will bypass the heating means.

A plurality of temperatures are sensed at a plurality of intermediate loci within the reaction zone, or intermediate the catalyst bed. The highest of this plurality is selected as the intermediate temperature, i.e. the temperature at that locus where the transition from exothermic to endothermic occurs, and a signal representative of the selected temperature is generated. The outlet temperature of the product effluent stream, or outlet of the catalyst bed, is also sensed and a third signal representative thereof is generated. Differential Temperature Recorders (dTR's) measure the delta-T between the inlet and selected intermediate temperatures, and the delta-T between the selected intermediate and the outlet temperatures. Representative signals are transmitted to a Double Differential Temperature Recorder Controller (DdTRC) which generates still another signal representing the difference between the two delta-T's; this last signal is transmitted to the TRC and an appropriate adjustment is made to the adjustable set point thereof which causes a corresponding change in the first signal to further regulate the quantity of charge stock caused to bypass the heating means. A Flow Recorder Controller (FRC), flow-sensing means (orifice plate or turbine meter) and flow-regulating means (flow control valve) are utilized to maintain the total fresh feed rate to the reaction zone substantially unchanged in order to conform to the design liquid hourly space velocity.

My invention further provides a high temperature override system, utilizing a high temperature signal selector. This further insures that excessive exothermic reactions will not create temperatures which might cause irreparable damage to the catalytic composite disposed within the reaction zone. To function, signals representing the outlet catalyst bed temperature and the highest intermediate bed temperature are transmitted to the High Signal Selector (HSS) as is the adjusted signal from the TRC. Normally, the last would be the controlling, or relatively highest signal. However, where the combination of exothermic and endothermic reactions results in excessive outlet or intermediate bed temperatures, the HSS selects the highest signal for adjusting, or overriding the signal otherwise transmitted to the flow-regulating means.

DESCRIPTION OF DRAWING

The accompanying diagrammatic illustration is presented for the sole purpose of affording a clear understanding of the control system and method encompassed by the present invention. It is not, therefore, considered to have a limiting effect upon the scope and spirit of my invention as defined by the appended claims. In the illustration, reaction zone 11 constitutes a selective hydrocracking system which is integrated into a combination process with a catalytic reforming unit. Since the latter forms no essential feature of my invention, it is not illustrated herein. Specific details of this "in-line" hydrocracking/catalytic reforming process are found in U.S. Pat. No. 3,847,792 (Cl. 208-60), issued Nov. 12, 1974. Briefly, the fresh feed charge stock is introduced, in admixture with excess hydrogen from the catalytic reforming system, into the hydrocracking zone. Product effluent, without intermediate separation, is increased in temperature (generally via a direct-fired heater) and introduced into the reforming zone.

Hydrocracking reaction zone 11 is unlike the more common hydrocracking processes both in function and result. The charge stock is characterized as being within the naphtha boiling range and the net product effluent contains very little normally gaseous material such as methane and ethane. Through the utilization of a particular catalytic composite, the integrity of cyclic rings is largely maintained, and the cracking of paraffins results in low molecular weight isoparaffins. The selective nature of the hydrocracking reactions taking place includes the retention of cyclic rings and the reduction in the molecular weight thereof, via isomerization and the splitting of paraffins from the parent cyclic molecule. As will be recognized by those having the requisite skill in the petroleum refining art, the reactions are both exothermic and endothermic in nature. Generally, exothermic reactions predominate in the initial portion of the reaction zone, while endothermic reactions are prevalent in the final portion of the catalyst bed. However, this does not necessarily hold true for all combinations of reaction conditions which are selected from those hereinafter specified. To illustrate, the exothermic reactions may not have been completed until a point following that at which the intermediate bed temperature is sensed, in which case the outlet temperature would be higher. Conversely, the completion of the endothermic reactions might take place at the very end of the catalyst bed to give a misleading outlet temperature. The use of the high signal selector override makes either situation innocuous.

The conversion conditions in the illustrated hydrocracking system include a liquid hourly space velocity ranging from about 0.5 to about 10.0, preferably having an upper limit of about 4.0, a hydrogen circulation rate of from about 1 to about 20 moles per mole of feed and a comparatively low pressure of about 100 psig. to about 500 psig. (7.8 to 35.0 atm.). Of greater significance, a maximum catalyst bed temperature of about 400° F. (204° C.) to about 800° F. (426° C.) is specified. In most instances the maximum catalyst bed temperature will be greater than 600° F. (315° C.). Temperature rise through the hydrocracking system (outlet temperature minus inlet temperature) is maintained at about 30° F. (16.7° C.) to about 100° F. (55.6° C.), and more often between about 40° F. (22.4° C.) and 75° F. (41.7° C.).

Specifically referring now to the drawing, reaction zone 11 is shown as a single vessel. Fresh feed charge stock enters the process by way of line 1; this contains a flow-control loop consisting of orifice plate 2 (or a venturi, or turbine meter), flow-control valve 3 and Flow Recorder Controller 4. The latter is equipped with an adjustable set point which permits changes in the liquid hourly space velocity; generally, however, the set point will remain substantially unchanged once a steady-state operation at design capacity has been achieved. The pressure differential across orifice plate 2 is transmitted via line 47 to FRC 4 and compared to the setting of the set point; any variance is transmitted to control valve 3, the opening of which is accordingly adjusted. A portion of the charge stock is diverted through line 5, containing flow-control valve 6, the remainder continuing through line 1 into heat-exchanger 7. Recycled, and/or make-up hydrogen is preferably added to the charge stock between control valve 3 and heat-exchanger 7. The charge stock in line 1 is at a temperature of approximately 212° F. (100° C.) and a pressure of about 455 psig. (32 atm.). The temperature is increased to about 762° F. (405° C.), in heat-exchanger 7, utilizing the catalytically reformed effluent at a temperature of about 980° F. (527° C.), as the heat-exchange medium in line 8; the cooled reformed effluent, at about 570° F. (299° C.) exits via line 9. The heated charge stock passes through conduit 10 and is admixed with the "cold" feed bypass stream in line 5, the mixture continuing therethrough, at a temperature of about 725° F. (385° C.) and a pressure of about 415 psig. (29.2 atm.), into reaction zone 11. Product effluent is withdrawn by way of conduit 12.

Control of the charge stock inlet temperature is effected by way of sensing means 13, illustrated as being disposed in reaction zone 11 proximate to the inlet of the catalyst bed. Temperature-sensing means 13 is shown as co-acting with Temperature Recorder Controller (TRC) 23, via instrument line 22. Controller 23 compares the indicated temperature with that which is specified by its adjustable set point; the signal representing the comparison is transmitted via instrument line 24, high signal selector (HSS) 25 and instrument line 46 to flow control valve 6, the opening of which is accordingly changed and the quantity of cold feed bypass in line 5 approximately adjusted.

A plurality of intermediate temperature-sensing means illustrated by 14, 15, 16, 17, 18, 19 and 20 are shown as co-acting with high temperature selector means 33 via instrument lines 26, 27, 28, 29, 30, 31 and 32, respectively. High Temperature Selector Means 33 selects the highest intermediate catalyst bed temperature from the temperatures indicated via said instrument lines.

Differential Temperature Recorder 37 receives, via lines 22 and 36 a first signal representative of the inlet temperature, and, via lines 34 and 38, a second signal representative of the highest intermediate catalyst bed temperature from Temperature Selector means 33, and thereupon develops a signal representing the difference, or the degree of exothermicity experienced in the upper portion of the catalyst bed. Differential Temperature Recorder 43 receives, via lines 34 and 41, the signal representing the selected highest intermediate catalyst bed temperature and, via lines 35 and 42, a signal representing the outlet temperature sensed by sensor 21. Another signal is developed representing the difference, or the degree of exothermicity experienced in the lower portion of the catalyst bed.

A Double Differential Temperature Recorder Controller (DdTRC) 40 receives the signal from dTR 37 via line 39 and the signal from dTR 43 via line 44, and generates a signal representing the comparison of the difference between the two delta-T's measured in the upper and lower portions of the catalyst bed, and its adjustable set point.

To account for the variations of temperature throughout the catalyst bed, as a result of both exothermic and endothermic reactions being effected, DdTRC 40 compares the difference between the two measured delta-T's with its set point and transmits the appropriate signal, via instrument line 45, to TRC 23. The set point of the latter is adjusted, effecting a change in the signal representing a comparison of the inlet temperature with that now called for by the set point. The degree of change in the signal effects further adjustment in the opening of control valve 6 to regulate the quantity of cold feed bypass. Override, or adjustment of the signal in line 24 is provided by High Signal Selector 25 which also receives the highest intermediate catalyst bed temperature signal through line 34 and the catalyst bed outlet temperature signal through line 35. The resulting overridden, or adjusted signal is transmitted to control valve 6 by way of line 46.

The foregoing, particularly when viewed in the light of the accompanying drawing, clearly indicates the method by which the present invention is effected. The benefits and advantages thereof will become apparent to those skilled in the appropriate art.

I claim as my invention:

1. In a hydrocarbon conversion method wherein (1) a hydrocarbonaceous charge stock is introduced into heating means in which the temperature thereof is increased prior to passing into an elongated reaction zone and, (2) the reactions effected in said elongated reaction zone are both exothermic and endothermic in nature, the method of controlling the temperature rise through said reaction zone which comprises the steps of:

(a) sensing (i) the temperature of said charge stock at the inlet to said reaction zone and developing a first signal representative thereof; (ii) the temperatures at a plurality of intermediate loci within said reaction zone, developing a plurality of signals, each being representative of and having associated therewith one of said temperatures, and selecting the signal representing the highest of said plurality of temperatures as a second signal; and (iii) the temperature of the effluent from said reaction zone and developing a third signal representative thereof;

(b) comparing said inlet charge stock temperature with that temperature specified by the adjustable set point of a temperature controller, developing a fourth signal representative of said comparison and regulating the quantity of said charge stock which is caused to bypass said heating means in response to said fourth signal;

(c) measuring the difference between said first and second signals and developing a fifth signal representative of said difference;

(d) measuring the difference between said second and third signals and developing a sixth signal representative of said difference;

(e) comparing said fifth and sixth signals, developing a seventh signal representative of said comparison and adjusting the set point of said temperature controller in response to said seventh signal; and, (f) further regulating the quantity of said charge stock which is caused to bypass said heating means in response to the adjustment of said set point.

2. The method of claim 1 further characterized in that a selection is made of the higher of said second and third signals and said fourth signal is adjusted in response to said selected higher signal to regulate the quantity of charge stock caused to bypass said heating means.

3. The method of claim 1 further characterized in that said seventh signal represents the difference between said fifth and sixth signals.

4. The method of claim 1 further characterized in that said fourth signal is transmitted to flow control means, from the resulting adjustment of which the quantity of said charge stock caused to bypass said heating means is regulated.

5. The method of claim 1 further characterized in that the total amount of said charge stock introduced into said reaction zone remains substantially unchanged.

6. In a hydrocarbon conversion apparatus wherein (1) a hydrocarbon charge stock is passed into heating means in which its temperature is increased prior to the introduction thereof into an elongated reaction zone and (2) the reactions effected in said zone are both exothermic and endothermic in nature, a control system for controlling the temperature rise through said elongated reaction zone which comprises, in cooperative relationship:

(a) first temperature-sensing means, sensing the temperature of said charge stock at the inlet to said reaction zone and developing a first signal representative thereof;

(b) a plurality of second temperature-sensing means sensing the temperatures at a plurality of intermediate loci within said reaction zone;

(c) high temperature selecting means, co-acting with said plurality of temperature-sensing means, selecting the highest of said temperatures and developing a second signal representative thereof;

(d) third temperature-sensing means, sensing the temperature of the effluent from said reaction zone and developing a third signal representative thereof;

(e) set point-adjustable temperature control means co-acting with said first signal and developing a fourth signal representative of a comparison between said first signal and said set point;

(f) flow regulating means co-acting with said fourth signal whereby the quantity of said charge stock bypassing said heating means is adjusted in response thereto;

(g) first differential temperature means measuring the difference between said first and second signals and developing a fifth signal representing said difference;

(h) second differential temperature means measuring the difference between said second and third signals and developing a sixth signal representing said difference;

(i) means for comparing said fifth and sixth signals, and developing a seventh signal representing the comparison; and, (j) means for adjusting the set point of said set point-adjustable temperature control means in response to said seventh signal.

7. The apparatus of claim 6 further characterized in having high-signal selecting means adjusting said fourth signal responsive to the higher of said second and third signals.

* * * * *